United States Patent [19]

Kooi

[11] 4,244,547

[45] Jan. 13, 1981

[54] THEODOLITE LEVELING MEANS

[75] Inventor: J. Peter E. Kooi, Succasunna, N.J.

[73] Assignee: Keuffel & Esser Company, Morristown, N.J.

[21] Appl. No.: 971,467

[22] Filed: Dec. 20, 1978

[51] Int. Cl.³ ............................................. F16M 11/12
[52] U.S. Cl. .................................... 248/180; 248/650
[58] Field of Search .............. 248/184, 179, 180, 178, 248/284, 188.2, 188.4, 649, 650

[56] References Cited

U.S. PATENT DOCUMENTS

| | | | |
|---|---|---|---|
| 1,182,881 | 5/1916 | Frye | 248/180 |
| 2,294,437 | 9/1942 | Allen et al. | 248/184 |
| 2,636,416 | 4/1953 | Platt | 248/188.4 X |
| 2,726,834 | 12/1955 | Hoge | 248/180 |
| 3,364,810 | 1/1968 | Hickerson | 248/180 X |
| 3,612,462 | 10/1971 | Mooney | 248/187 X |
| 3,782,671 | 1/1974 | Igwe | 248/187 X |
| 3,931,947 | 1/1976 | Tagnon | 248/184 X |

FOREIGN PATENT DOCUMENTS 1350566  4/1974  United Kingdom .

Primary Examiner—J. Franklin Foss
Attorney, Agent, or Firm—Lionel N. White

[57] ABSTRACT

A low-profile theodolite leveling means comprises a tribrach assembly including three separate platforms of which the second is mounted upon the first by means of a pair of pivot elements which establish a first fixed axis of tilt of the second platform, and the third is similarly mounted on the second by means of a pair of pivots which likewise establish a second fixed axis of tilt, orthogonal to the first axis, for the third platform. Located in use between a tripod head and the base of a theodolite geodetic instrument, the tribrach assembly provides means for tilting the theodolite instrument with respect to independent planes defined by the orthogonally disposed axes of tilt and respective adjustment screw members.

10 Claims, 4 Drawing Figures

THEODOLITE LEVELING MEANS

BACKGROUND

Geodetic instruments, such as theodolites or transits, are normally mounted upon tripods or similar supports during actual use in the field. In order that the spindle of an instrument alidade may be referenced precisely to the vertical datum, means are usually provided, either as an integral part of the geodetic instrument or as a separate fixture, by which the base of the instrument may be adjusted in two orthogonal planes. Such leveling means are usually situated between the head plate of the tripod and the base plate of the geodetic instrument and comprises a plurality of threaded adjusting legs by means of which the instrument may be tilted with respect to the tripod head in either of the two planes in order to achieve a level datum condition.

Previous leveling means for geodetic instruments have comprised the four-screw combination, such as may be seen in U.S. Pat. No. 2,746,155, or the three-screw system generally described in U.S. Pat. No. 3,417,394. Substantially equivalent to the three-screw leveling means is that employing two screws and a third cooperating stationary post.

Adjustments utilizing the four-screw system require simultaneous manipulation of diametrically opposed screws in order to effect leveling movement in each of the two planes. As a result, it is not uncommon for such four-screw systems to suffer from errors in manipulation such that one or more of the adjustment screws is forcibly strained against movement of another with resulting permanent damage to the leveling system. While the three-screw system for leveling a geodetic instrument does not suffer in a similar manner, it does have a disadvantage of azimuthal instability unless highly precise adjusting screws are employed. Also, due to the fact that three-point systems comprise a single mobile platform, cross-coupling is an inherent drawback. That is to say, a desired adjusting movement in one of the two leveling planes is not isolated to that plane, rather some vector of the movement is translated into movement in the other plane, resulting in continuous misadjustment or, at best, a prolonged adjusting procedure.

The instrument leveling means of the present invention comprises two independently mobile platforms, the tilting movement of each of which is controlled by a single separate adjusting screw. The freedom of movement of the platforms and the isolation of the mobility of one from the other eliminate the noted major disadvantages of previous types of leveling systems. The construction of the present leveling platform, or tribrach, is such that the system as a whole maintains a particularly low profile which in higher order geodetic instruments eliminates misreadings which often result from the effects of wind upon the supported instrument.

SUMMARY

The tribrach of the present invention comprises essentially three separate platform elements which are arranged for independent movement with respect to one another, yet are constrained such that such movement is limited to tilting in two separate plates about orthogonally disposed axes. In the present construction the lower platform includes means by which it is affixed to the head plate of a tripod, the second platform is mounted upon the base platform by means of a pair of posts which define the axis of tilt and a third adjustable screw post which defines with the permanent posts a first tilt plane, and a third platform mounted upon the second by means of a pair of permanent posts and a third adjustable screw post, the pair of permanent posts establishing an axis of tilt of the middle or second platform.

The upper platform includes means by which the base of a theodolite, or other geodetic instrument, may be firmly yet removably affixed to the tribrach assembly in order to provide for ready interchange of geodetic instruments. The tribrach assembly is retained as a stable unit by resilient spring means which urge each of the permanent and adjustment posts into kinematic seatings at their fixed designated locations.

DRAWINGS

DESCRIPTION

Figure 2:
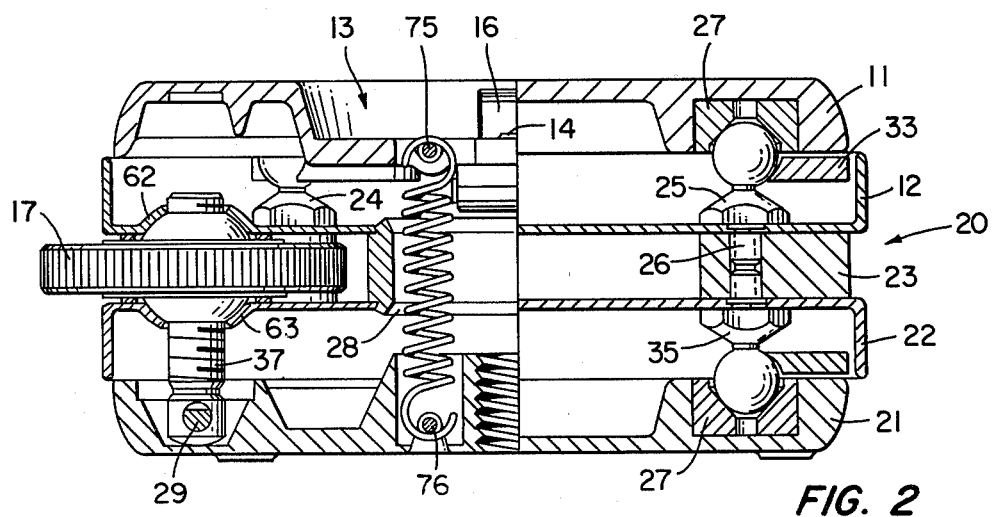
FIG. 2 is an elevation view in section taken along the line 2—2 of FIG. 1.

As can be seen in FIG. 2, the present tribrach comprises a first, lower platform in the form of lower body casting 21, a middle platform designated at 20 which comprises upper body plate 12 and lower body plate 22 coupled together by means of fillet ring 28 and fillet plate 23, such as with threaded studs 26 of ball pivot members 25, 35. A third, upper platform in the form of upper body casting 11 completes the individual platform elements of the tribrach assembly.

Figure 3:
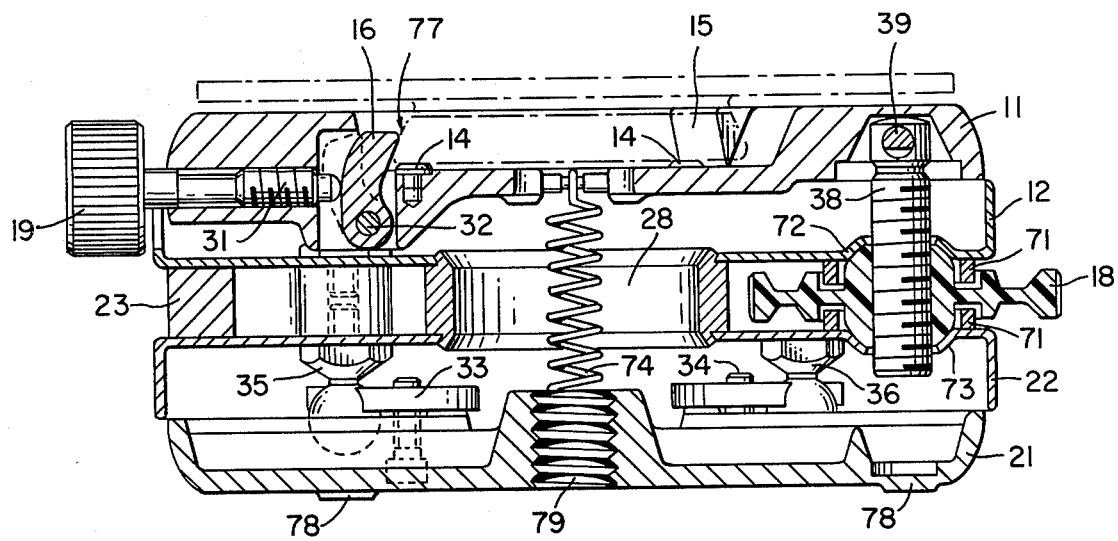
FIG. 3 is an elevation view in section taken along the line 3—3 of FIG. 1.
Figure 4:
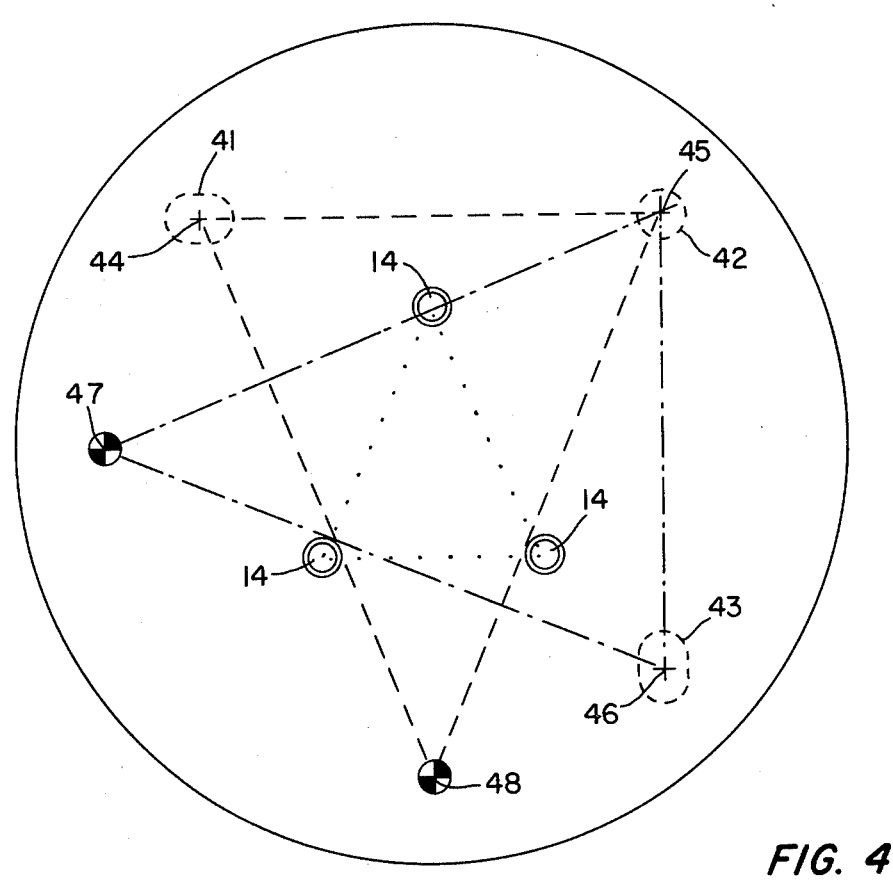
FIG. 4 is a schematic diagram, oriented according to FIG. 1, indicating the planes of adjustment established in the tribrach of the present invention.

Affixed at the under surface of lower body plate 22 are ball pivot members 35, 36, seen in FIG. 3, the centers of the respective balls of which are represented in FIG. 4 by the points 45, 46. These ball members form the stationary post supports for middle platform 20. Threaded spindle 37 pivotally affixed to lower body casting 21 by means of spindle pivot pin 29 forms the third support for platform 20.

The axial center of spindle 37 is represented in FIG. 4 at 47 where it establishes with centers 45, 46 a triangle defining the effective plane of middle platform 20. This plane will be seen to be tiltable about the axis defined by the triangle base 45–46.

In similar manner, the upper tribrach platform comprising upper body casting 11 is supported on ball pivot members 24, 25, seen in FIG. 2, and threaded spindle 38 which is affixed to upper body casting 11 by means of spindle pivot pin 39, as seen in FIG. 3. These upper platform support elements are represented in FIG. 4 as ball pivot member centers 44, 45 and spindle center 48 which define the effective plane of the upper platform tiltable about fixed axis 44–45. As is apparent in FIG. 4 this tilt axis is arranged to be precisely orthogonal to tilt axis 45–46 of the middle platform of the tribrach assembly.

Figure 1:
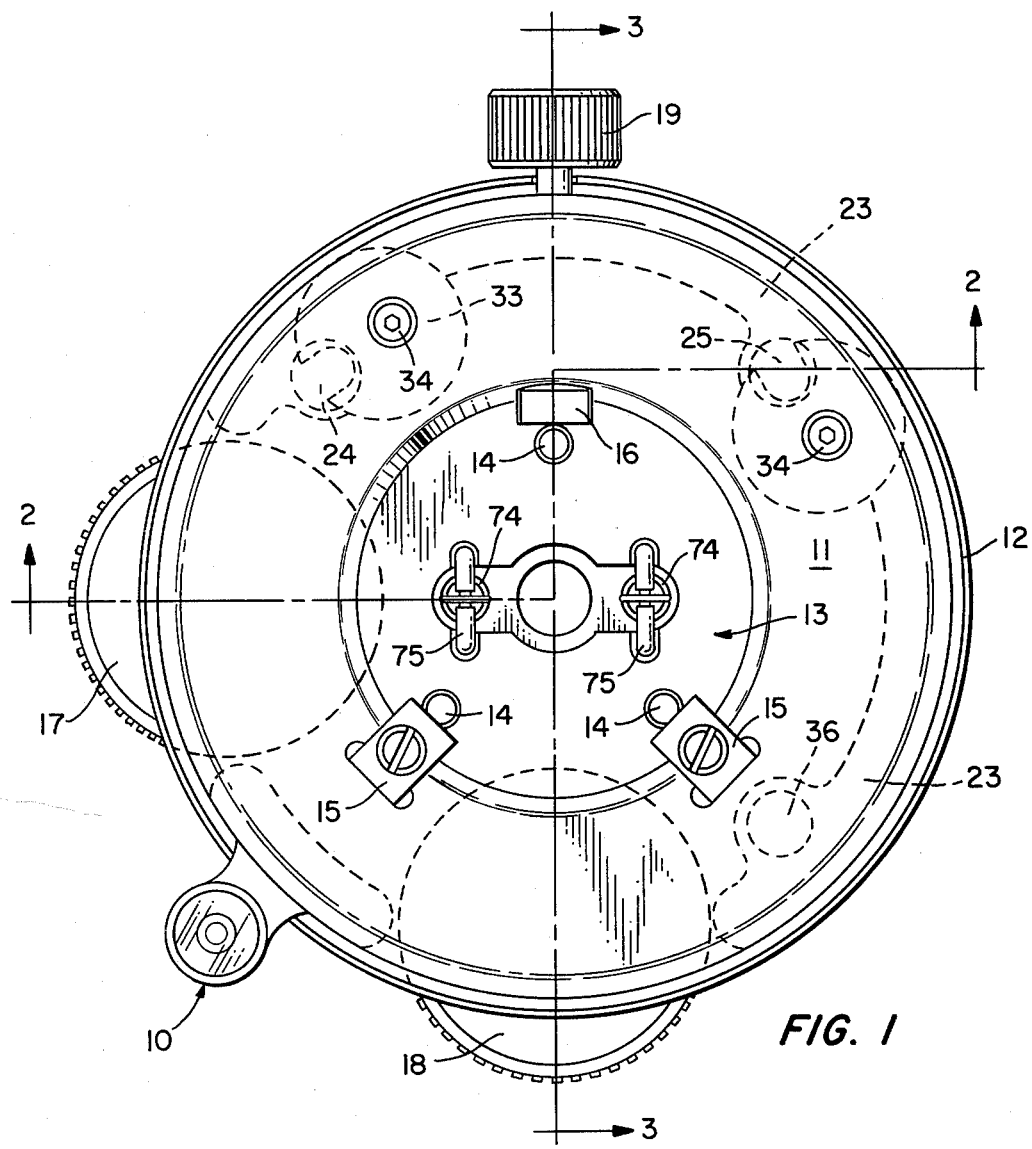
FIG. 1 is the plan view of the improved tribrach leveling means of the present invention.

As seen in FIG. 1 there is formed in the central portion of upper body casting 11 a well 13 which is intended to receive the base of a theodolite with which the tribrach leveling means is to be used. In the floor of the well are set studs 14, generally in the form of a triangle, which constitute foundation pads defining the datum plane of the theodolite instrument. This plane is represented in FIG. 4 by the dotted triangle between pads 14 and constitutes the major datum plane of the tribrach which is adjusted to a precise level attitude by tilting manipulation of the effective planes of the middle and upper platform sub-assemblies, respectively.

Referring to FIG. 2, one will observe that hardened inserts 27, of stainless steel for example, are located in upper and lower body castings 11, 21 to form sockets in which the balls of pivot members 25, 35 are respectively received. It will be noted that the centers of the respective balls of members 25, 35 are vertically aligned and are commonly represented at 45 in FIG. 4. The sockets formed in inserts 27 are of circular cone shape thereby effecting a precise fit with balls 25, 35. As a result, all three platforms are fixed at the vertical projection of point 45 against horizontal translation.

Socket inserts are similarly provided for receiving balls of members 24, 36. However, as shown in FIG. 4, the configuration of the sockets of these remaining insert members are, as represented at 41, 43, of oval cone shape with the major axes lying substantially parallel to the respective base lines of the tilting plane triangles depicted. The purpose of so elongating the conical sockets at these locations is to simplify assembly while ensuring against displacement of ball centers 44, 46 about center 45. In the former respect the elongation of sockets 41, 43 eliminates the need for precise matching of the distances between the respective centers of the balls and sockets along each of the base lines of the tilting planes. The combinations of circular and oval sockets nevertheless establish immobility of the base lines 44-45 and 45-46 against axial and pivoting movement in the plane of FIG. 4 and thereby precisely define axes of tilt of each of the middle and upper platforms of the tribrach assembly with respect to the lower platform and the tripod head to which it is attached.

Level adjustment in the present tribrach, which covers a range of about ±7° for each plane, is effected by means of adjustment wheels 17, 18 which are respectively in threaded engagement with spindles 37, 38. The internally threaded spherical hub of each adjustment wheel is substantially encompassed by spherical socket portions of middle platform 20, such as 62, 63 formed respectively in body plates 12, 22. The preferred low-friction plastic material of which the adjustment wheel is composed forms a smoothly mobile ball and socket pivot which provides easy rotation of the adjustment wheel as well as allowing for tilt of the spindle to compensate for the adjusting movement of the respective platform member.

In addition, the fact that the vertical force supported by spindle 37 is borne at the spherical interface of the hub of wheel 17 and socket 62 and at the two lines of contact formed by relief of spindle pivot pin 29, as seen in FIG. 2, ensures that the effective plane of the middle platform will consistently come to rest at the lowest point afforded by the height of adjusting wheel 17. Expensive parts requirements, as in the spindle thread for example, may thus be eliminated, since the consistency of the positioning of a tilting platform in the present invention is not a function of the precision of parts, rather it is a function of the manner in which the described assembly consistently seeks and settles into the lowest available attitude.

In similar manner, the upper platform comprising upper body casting 11 is supported by the primary ball joint pivot comprising ball element of member 25 seated in the circular cone socket represented at 42 in FIG. 4. With ball pivot element 24 and elongated oval cone socket 41 this primary pivot fixes the tilt axis 44-45 of the effective plane of the upper platform. Adjustment of the tilt of this plane is effected by manipulation of adjustment wheel 18 the spherical hub of which is retained in socket portions 72, 73 of the body plates 12, 22 of the middle platform 20. The vertical force applied along the axis of spindle 38 is borne by the interface of socket portion 73 and the spherical hub of wheel 18 along with the lines of contact in relieved pivot pin 39. As previously described, the downward force resulting from the weight of the theodolite causes spindle 38 and the hub of wheel 18 to find and maintain a stable central location in socket portion 73 thereby effecting the consistancy of the location of pivot center 48 indicated in FIG. 4.

While in actual use the pivots of the present tribrach assembly are held in firm engagement with their respective sockets under the weight of the theodolite or other geodetic instrument which it supports. In the preferred embodiment of the assembly shown in the accompanying drawings, however, a pair of springs 74 extending between pairs of anchor pins 75, 76 located in recesses in the upper and lower body casting members 11, 21 maintain the unity of the assembly whether the tribrach is in use or separately removed from the tripod stand. Further assisting in the maintenance of the unity of the assembly are collar plates 33 which encompass the neck portions of the ball pivot members and are affixed to respective body casting members 11, 21 by means of cap screws 34. Further, since it is important to maintain a dust-free environment for the socket and ball joints, the circumferential edges of body plates 12, 22 of middle platform 20 are turned to form upstanding rims which in combination with the closely adjacent circumferential edges of respective upper and lower body casting members 11, 21 form a satisfactory dust-free seal. Further protection for the ball-and socket joints of adjusting wheels 17, 18 is provided by rings 71 forming labyrinth seals about the spherical hubs of the adjusting wheels, as shown in FIG. 3, and fillet ring 28 which isolates centrally-located access holes of body plates 12, 22.

In accordance with a preferred manner of retaining a theodolite base within the well 13 of the tribrach assembly and in firm contact with foundation pads 14, there are provided about the circumference of the well and in overlying association with a pair of such pads two fixed theodolite base anchor blocks 15 whose inwardly disposed faces are beveled to match the bevel of the theodolite base, shown in phantom at 77 in FIG. 3. Overlying the third pad 14 is a pivoted locking tongue 16 whose inwardly disposed face is similarly conformed to the shape of the beveled theodolite base. Torsion spring means, not shown, urges locking tongue 16 in the counter-clockwise direction (FIG. 3) causing the tongue to be normally withdrawn from engagement with the theodolite base. Bearing upon tongue 16 is the spherical end of threaded rod 31 which may be advanced through the cooperating tap in upper body casting 11 by means of the externally accessible locking knob 19. Advancement or withdrawal of threaded rod 31 will, as is apparent, force locking tongue 16 into an engagement with the theodolite base or allow pivoting of the tongue about pin 32 away from contact with the base to allow removal of the instrument from the tribrach support.

To provide means conforming to the generally accepted method of mounting a tribrach apparatus to the head of a tripod support, lower body casting 21 of the present assembly comprises foot projections 78 and a centrally located tapped bore 79 to receive the threaded spindle normally comprising a tripod head assembly. In order to accommodate the various individual shapes and styles of theodolite bases in use throughout the field, it is anticipated that accessory units capable of engaging such bases and having the external configuration of the beveled conical base generally shown at 77 in FIG. 3 will be made available to enable the present tribrach leveling assembly to be universally employed. Spirit levels are normally included as part of a geodetic instrument and will be utilized in most instances to provide the necessary indication of attitude during the leveling process. As an adjunct to provide still further utility, for example as a leveling platform for other surveying equipment such as targets, rods, prisms, reflectors, ranging devices, or the like, there may be included on the present tribrach a common two-plane, or "bulls-eye", spirit level device 10 matched to the major datum plane 14—14—14 of FIG. 4.

What is claimed is:

1. Adjustable leveling means comprising:
   (a) a base platform establishing a fixed base plane;
   (b) an intermediate platform defining a first tilt plane mounted upon said base platform by means comprising a first pair of fixed post members terminating in substantially spherical surfaces and a pair of socket members disposed to respectively receive therein each of said spherical surfaces and form a pivot therewith, the centers of curvature of said spherical surfaces establishing a first fixed tilt axis oriented substantially parallel to said base plane and about which said first tilt plane is tiltable with respect to said base plane;
   (c) first adjusting means for imparting increments of tilt to said first tilt plane;
   (d) an upper platform defining a second tilt plane mounted upon said intermediate platform by means comprising a second pair of fixed post members terminating in substantially spherical surfaces and a pair of socket members disposed to respectively receive therein each of said spherical surfaces and form a pivot therewith, the centers of curvature of said spherical surfaces establishing a second fixed tilt axis oriented substantially orthogonal to said first tilt axis and about which said second tilt plane is tiltable with respect to said first tilt plane;
   (e) second adjusting means for imparting increments of tilt to said second tilt plane; and
   (f) means comprising said upper platform establishing a major datum plane; whereby cooperative manipulation of said first and second adjusting means will orient said major datum plane in a desired stable, fixed attitude with respect to said base plane.

2. Leveling means according to claim 1 wherein each said tilt adjusting means comprises a threaded spindle and an adjusting wheel the hub of which is in threaded engagement with said spindle, each of said spindle and said wheel hub bearing respectively on separate platforms between which relative tilt is to be imparted.

3. Leveling means according to claim 2 wherein the platform-bearing portions of each of said spindle and said wheel are located respectively at the apexes of isoceles triangles they form with the pair of post members establishing the relevant tilt axis.

4. Leveling means according to claim 2 wherein said adjusting wheel hub comprises a spherical surface and the platform upon which said hub bears comprises a spherical concavity in which said hub is received.

5. Leveling means according to claim 4 wherein the spherical hubs of both adjusting wheels are received in concavities formed in said intermediate platform.

6. Leveling means according to claim 5 wherein said intermediate platform comprises a pair of parallel spaced plates in which are formed two pairs of facing spherical concavities, each pair substantially encompassing a different one of said spherical adjusting wheel hubs.

7. Leveling means according to claim 2 wherein means mounting said spindle in bearing association with a platform comprises a pivot pin, a portion of the circumference of said pin being removed to form a longitudinal flat, the longitudinal edges of said flat constituting substantially parallel lines of bearing contact with the pivot bore of said spindle, thereby providing stability against spindle movement transversely of said pivot pin.

8. Leveling means according to claim 1 wherein each of said tilt axis pivot socket pairs comprises a circular conical socket and an oval conical socket.

9. Leveling means according to claim 1 wherein said upper platform comprises a plurality of support members establishing said datum plane and means for firmly, yet releasably urging into engagement with said support members the base of an object to be leveled.

10. Leveling means according to claim 9 wherein said urging means comprises a pair of spaced stationary wedge members closely disposed above said support members and oriented to displace downwardly into firm contact therewith an object base moved along said support plane into engagement with said wedge members and means for imparting such movement to said object base.

* * * * *